US009976858B2

(12) United States Patent
Andersson et al.

(10) Patent No.: US 9,976,858 B2
(45) Date of Patent: May 22, 2018

(54) MEMS GYRO

(71) Applicant: ACREO SWEDISH ICT AB, Kista (SE)

(72) Inventors: Gert Andersson, Lindome (SE); Erik Svensson, Goteborg (SE); Borys Stoew, Goteborg (SE); Nils Hedenstierna, Vastra Frolunda (SE)

(73) Assignee: RISE ACREO AE, Kista (SE)

( * ) Notice: Subject to any disclaimer, the term of this patent is extended or adjusted under 35 U.S.C. 154(b) by 0 days. days.

(21) Appl. No.: 15/532,151

(22) PCT Filed: Dec. 17, 2015

(86) PCT No.: PCT/EP2015/080179
§ 371 (c)(1),
(2) Date: Jun. 1, 2017

(87) PCT Pub. No.: WO2016/097117
PCT Pub. Date: Jun. 23, 2016

(65) Prior Publication Data
US 2017/0268879 A1    Sep. 21, 2017

(30) Foreign Application Priority Data

Dec. 18, 2014   (EP) .................................... 14198942

(51) Int. Cl.
| *G01C 19/56* | (2012.01) |
| *G01C 19/5712* | (2012.01) |
| *G01C 19/5719* | (2012.01) |
| *G01C 19/5747* | (2012.01) |
| *G01C 19/574* | (2012.01) |

(52) U.S. Cl.
CPC ....... *G01C 19/5712* (2013.01); *G01C 19/574* (2013.01); *G01C 19/5719* (2013.01); *G01C 19/5747* (2013.01)

(58) Field of Classification Search
CPC ............ G01C 19/5712; G01C 19/5719; G01C 19/5747; G01C 19/5656; G01C 19/574
See application file for complete search history.

(56) References Cited

U.S. PATENT DOCUMENTS

| 5,723,790 A * | 3/1998 | Andersson ......... G01C 19/5656 |
| | | 257/417 |
| 5,869,760 A * | 2/1999 | Geen .................. G01C 19/5712 |
| | | 73/504.04 |

(Continued)

OTHER PUBLICATIONS

International Search Report PCT/ISA/210 for International Application No. PCT/EP2015/080179 dated Mar. 11, 2016.

(Continued)

*Primary Examiner* — Helen Kwok
(74) *Attorney, Agent, or Firm* — Harness, Dickey & Pierce, P.L.C.

(57) ABSTRACT

A sensor is disclosed for detecting a rotational motion about a resulting sensitivity axis. The sensor includes at least two dual mass gyroscope units, each of the gyroscope units are adapted to detect a rotational motion about a sensitivity axis of the respective gyroscope unit. The sensitivity axes being parallel to each other and to the resulting sensitivity axis. The gyroscope units are interconnected at the inertial masses of the gyroscope units which cause the gyroscope unit to operate synchronously.

15 Claims, 5 Drawing Sheets

(56) References Cited

U.S. PATENT DOCUMENTS

| | | | | |
|---|---|---|---|---|
| 5,992,233 A * | 11/1999 | Clark | G01C 19/5719 | 361/280 |
| 6,467,349 B1 | 10/2002 | Andersson et al. | | |
| 6,626,039 B1 * | 9/2003 | Adams | G01C 19/5719 | 73/504.04 |
| 6,767,758 B1 | 7/2004 | Geen | | |
| 6,837,107 B2 * | 1/2005 | Geen | G01C 19/5712 | 73/504.04 |
| 7,461,552 B2 * | 12/2008 | Acar | G01P 15/125 | 73/504.04 |
| 7,950,281 B2 * | 5/2011 | Hammerschmidt | G01C 19/5719 | 73/504.04 |
| 8,266,961 B2 * | 9/2012 | Kuang | G01C 19/5712 | 73/504.16 |
| 8,342,023 B2 * | 1/2013 | Geiger | G01C 19/574 | 73/504.04 |
| 8,844,357 B2 * | 9/2014 | Scheben | G01C 19/5747 | 73/504.12 |
| 9,038,460 B2 * | 5/2015 | Walther | G01C 19/5712 | 73/504.03 |
| 2006/0272409 A1 | 12/2006 | Acar et al. | | |
| 2010/0263446 A1 | 10/2010 | Tamura et al. | | |
| 2011/0041609 A1 * | 2/2011 | Clark | G01P 15/097 | 73/514.29 |
| 2013/0061672 A1 | 3/2013 | Coronato et al. | | |
| 2014/0007681 A1 * | 1/2014 | Lin | G01C 19/5733 | 73/504.12 |
| 2014/0260608 A1 | 9/2014 | Lin et al. | | |
| 2014/0352431 A1 | 12/2014 | Leclerc | | |

OTHER PUBLICATIONS

Written Opinion of the International Searching Authority PCT/ISA/237 for International Application No. PCT/EP2015/080179 dated Mar. 11, 2016.

* cited by examiner

MEMS GYRO

FIELD OF THE INVENTION

The present invention relates to a microelectromechanical system (MEMS) based gyroscope.

BACKGROUND

With the development of sophisticated methods for manufacturing micrometer structures in a controlled way, devices based on microelectromechanical system (MEMS) technology has become more attractive. One important type of device which has found a vast number of applications is the MEMS-based gyroscope. Such a device has great importance in e.g. navigation, positioning, and tracking of devices, but also for monitoring and controlling mechanical stability of apparatuses onto which a MEMS gyroscope may be mounted.

A great challenge in manufacturing a MEMS gyroscope is to achieve a reliable manufacturing method for fabricating sufficiently well-balanced gyroscope devices, preferably in a mass-production line. Such a gyroscope device typically comprises a number of interconnected inertial masses which may be excited to rotate or vibrate about an excitation axis during operation. Detection of a rotational motion is performed by detecting a deflection of the inertial mass about a detection axis influenced by the corolis force. However, manufacturing defects may introduce asymmetry in the gyroscope which may affect the operation in a negative way. For example, if the gyroscope is not well-balanced, external vibrations may excite vibration modes of the gyroscope, thus distorting also the sense mode causing a relatively high error in the output signal.

In order to avoid the external vibrations the gyroscope may have to be isolated from the sources of vibration, or only well-balanced gyroscopes are used, which effectively leads to low fabrication yields.

U.S. Pat. No. 6,467,349 discloses a MEMS gyroscope with relatively good performance for several applications, for example in the automotive industry. However, it would be desirable to reduce the impact of external vibrations on such a gyroscope in order to further improve the performance.

Thus, there is a need for more robust gyroscope sensor which is less sensitive to external vibrations with an improved structural configuration.

SUMMARY OF THE INVENTION

In view of the above, it is a general object of the present invention to provide a gyroscope sensor which is less sensitive to external vibrations.

According to a first aspect it is therefore provided a sensor for detecting a rotational motion about a resulting sensitivity axis, the sensor comprising at least two dual mass gyroscope units, each of the gyroscope units being adapted to detect a rotational motion about a sensitivity axis of the respective gyroscope unit, the sensitivity axes being parallel to each other and to the resulting sensitivity axis, each of the gyroscope units comprising:

a total inertial mass comprising a first inertial mass and a second inertial mass physically attached to each other, each of the first and second mass being arranged spatially spaced apart from and facing a respective first and a respective second electrode, wherein a rotation of the first mass about a detection axis of the sensor unit, the detection axis being perpendicular to the sensitivity axis and to the excitation axis and the rotation being caused by the coriolis force when the sensor unit is subjected to a rotation about the sensitivity axis, results in a positive change of the capacitance between the total inertial mass and one of the first and the second electrode and a negative change of the capacitance between the total inertial mass and the other one of the first and the second electrode;

first excitation means for causing the first mass to oscillate in a rotational motion about a first excitation axis substantially perpendicular to the sensitivity axis of the gyroscope unit;

second excitation means for exciting the second mass to oscillate in a rotational motion about a second excitation axis substantially perpendicular to the sensitivity axis of the gyroscope unit and parallel with the first excitation axis, the oscillation of the second mass being in anti-phase with the oscillation of the first mass;

wherein the first mass of a first gyroscope unit is connected by a connecting element to the first mass of a second gyroscope unit such that a rotation of the first mass of the first gyroscope unit in a first direction about the excitation axis causes the first mass of the second gyroscope unit to rotate about its respective excitation axis in an opposite direction compared to the first direction wherein each of the first and second mass of each gyroscope unit comprises a first and a second half portion, the first and the second half portion being defined by opposite sides of an axis parallel to the sensitivity axis and intersecting the excitation axis of the respective mass, wherein the connecting element is connected to the first half portion of the first mass of the first gyroscope unit and to the second half portion of the first mass of the second gyroscope unit.

In accordance with the invention, a dual mass gyroscope is a gyroscope comprising at least two inertial masses. Furthermore, an inertial mass of a gyroscope is the mass which is set in motion by an excitation, whereby the excitation causes the inertial mass to rotate or oscillate in a rotational manner. When the inertial mass is subjected to a rotation away from a horizontal orientation about the sensitivity axis which is perpendicular to the excitation axis (thus the axis about which the inertial masses are set in motion), the inertial mass rotates about a detection axis due to the coriolis force. The detection axis, the sensitive axis, and the excitation axis are perpendicular to each other.

Each of the first and second masses has a respective corresponding first and second electrode. The first and second electrode of each mass are arranged such that the respective inertial mass faces the electrodes. The inertial masses are spaced apart from the electrodes as they may not be in physical contact with each other. The first and the second electrode are fixed (thus static) such that the capacitance between the first electrode and the inertial masses and the capacitance between the second electrode and the inertial masses is modified as a result of a motion of the inertial masses. Thereby, the first and second electrodes are arranged such that a rotation of the respective inertial mass about the detection axis results in a capacitance change of a first sign (e.g. negative) between one of the first electrode or the second electrode, and the first inertial mass; and a capacitance change of an opposite sign (e.g. positive if the first sign is negative) between the other one of the first or the second electrode and the first inertial mass. Analogously, the same applies for the second inertial mass when the respective inertial mass rotates about the detection axis, i.e. it results in a positive change of capacitance between the second inertial mass and one of the first and second electrodes, and a negative change of the capacitance between the second inertial mass and the other one of the first and second electrode, In other words, a rotation of the first and the second inertial mass (total inertial mass) about a detection axis results in a positive change of capacitance between the total inertial mass and one of the first and the second electrode and a negative change of the capacitance between the total inertial mass and the other one of the first and the second electrode.

The two masses are excited such that they oscillate in anti-phase with each other in a rotational motion about the excitation axis. Thus, when the first mass oscillates in a counter-clockwise direction, the second mass oscillates in a clockwise direction.

Further in accordance with the invention, the first mass of a first gyroscope unit is connected to a first mass of a second gyroscope unit. Thereby the motions of the first masses of the first and second gyroscope units may be coupled such that the rotation of the first masses of the two gyroscope units is opposite in direction with respect to each other. For example, at a given time, if the first mass of the first gyroscope unit rotates in a counter-clockwise direction the first mass of the second mass may rotate in a clockwise direction about the excitation axis.

Furthermore, the first mass of the first gyroscope unit and the first mass of the second gyroscope unit may oscillate synchronously in anti-phase with respect to each other.

The present invention is based on the realization that the influence of external vibration may be suppressed by interconnecting an even number of gyroscope units operating in anti-phase. In general, a gyroscope may be sensitive to external vibrations, especially if manufacturing errors have made the inertial masses of the gyroscope unbalanced or spring forces of the gyroscope are unsymmetrical. The external vibrations may influence the sense mode, and may saturate the measurement electronics. With the invention, the interconnected gyroscope units are operating in anti-phase and thereby automatically counteract the influence from small manufacturing errors (causing e.g. inertial mass unbalance) which otherwise may make a single gyroscope unit sensitive to an external vibration. The connecting element forces the drive motion (i.e. excitation about the excitation axis) of the two gyroscope units to be synchronous, thus reducing or even eliminating the effect from mass unbalance or unsymmetrical spring forces due to manufacturing imperfections in the excitation mode. Furthermore, the connecting element makes the motion about the detection axis of the inertial masses more synchronous, thereby reducing or even eliminating the effect from mass unbalance or unsymmetrical spring forces due to e.g. manufacturing imperfections also in the sense mode. Thus, with the invention, the risk of an excitation of any of the lower eigenmodes of the individual gyroscope units by an external vibration is substantially reduced, or even eliminated. An example of a manufacturing error may be a linear thickness gradient over an even number of gyroscope units which make the inertial mass of the individual gyroscope units unbalanced. As an example, the driving of the gyroscope sensor may be done with an excitation at e.g. 5-55 kHz. With the invention, the connection element may set the eigenmodes where the inertial masses rotate in the same direction to at least 3 times the excitation frequency, or even to at least 10 times the excitation frequency and/or to less than 1 MHz, 2 MHz or 5 MHz.

Preferably, the sensitivity axes of the gyroscope units are in the same plane.

Moreover, the masses of adjacent gyroscope units are connected to each other at halves of each mass, where the halves of the respective masses are on opposite sides. This way, the first inertial mass of the first gyroscope unit and the first inertial mass of the second gyroscope unit rotate about its respective excitation axis in opposite directions with a less complicated mechanical layout as compared to being connected at the other half portions of the inertial masses. In more detail, this setup usually allows for a simpler design with higher manufacturing tolerances, i.e. its more robust.

According to an embodiment of the invention, the connecting element may be connected to a first side of the first mass of the first gyroscope unit, and to a second side of the first mass of the second gyroscope unit, wherein the first side and the second side face each other. Thus, the connecting element may advantageously be connected to the first inertial mass of each of the two gyroscope units at sides of the respective inertial mass being adjacent to each other. For example, if the layout of the inertial mass of the gyroscope units is polygonal, the connection element is connected to sides of the polygonal layout of each first inertial mass in a way that the sides face each other. This connection at sides facing each other enables facilitated construction (manufacturing) of the sensor. For example, a relatively small (e.g. short) connection element is sufficient reducing the risk of manufacturing defects.

The connecting element may preferably be self-supporting. For example, a rigid connecting element may be possible. A self-supporting connecting element enables for the inertial masses connected to each other via the connecting element to push on each other via the connecting element. Naturally, a pull action is also possible. An efficient synchronization of the interconnected inertial masses via the connecting element is thereby enabled.

Furthermore, the connecting element may be a resilient connection. A resilient connection allows the connection element to be deformed when exposed to a force and later reverse deformed when the force is relieved. Thus, when the force is relieved, a resilient connection springs back into its original shape.

An operationally efficient and relatively manufacturing friendly connecting element may be S-shaped or Z-shaped.

The oscillation of the first mass of the first gyroscope unit and the first mass of the second gyroscope unit may be synchronous and in anti-phase with respect to each other about the respective excitation axis.

In yet another embodiment of the invention, the gyroscope unit is provided with drive frames comprising the first excitation means and the second excitation means, the drive frames are arranged external to the first and second mass, each of the drive frames being connected to a respective mass with a coupling member. The drive frames are external in a way that they are arranged as a separate mechanical unit. Each of the drive frames is connected to the respective mass with a coupling member which is preferably self-supporting. Excitation of the inertial mass may be accomplished by causing the drive frame to move, thereby causing the inertial mass to move (i.e. oscillate) via the coupling member.

In yet another exemplary embodiment each of said first and second excitation means is configured to alternatingly move each of said drive frames along a direction parallel to the sensitivity axis in order to cause each of said first mass and said second mass to oscillate in a rotational motion about said first excitation axis and said second excitation axis respectively.

The at least two gyroscope units may be further connected via a second connecting element, wherein the second mass of a first gyroscope unit is connected by the second connecting element to the second mass of a second gyroscope unit such that a rotation of the second mass of the first gyroscope unit in a first direction about the corresponding excitation axis causes the second mass of the second gyroscope unit to rotate about its respective excitation axis in an opposite direction compared to the first direction. In other words, two adjacent gyroscope units may be connected by a second connecting element, similar to the first connecting element, at the respective second inertial mass of each gyroscope unit.

Furthermore, more than two gyroscope units may be connected via further connecting members. For example, a third gyroscope unit may be connected to the second gyroscope unit in a way similar to how the first gyroscope unit is connected to the second gyroscope unit. Similarly, a fourth gyroscope unit may be connected to the third gyroscope unit via additional connecting members with structural and functional features as described with reference to the first and second connecting elements. Preferably, the number of gyroscope units of the sensor is even. For example, the number of gyroscope units of the sensor may be two, four, six, eight, etc.

According to embodiments of the invention, the sensor may be a planar sensor. In other words, parts of the sensor, e.g. at least a part of the inertial masses and the connection elements may be arranged in the same center plane when the sensor is at rest. The inertial masses and the connection elements may be arranged in a layer of the sensor.

For example, the first and second inertial mass and the connection element may be formed in a single unit. Thus the first and second inertial mass and the connection element may be epitaxially grown on a substrate (e.g. a Si-substrate) and patterned and etched using lithography and etching methods of micro- and nanofabrication techniques capable of manufacturing a structure (inertial masses and connection element) having even and well-defined thickness.

The first and second inertial masses may be connected via an elongated connector, wherein the first and second masses are symmetrically arranged with respect to the elongated connector. Furthermore, the three-dimensional shape of the first mass is substantially the same as the three-dimensional shape of the second mass. However, the second mass is inverted (e.g. an mirror image) compared to the first mass with respect to the sensitivity axis and/or the detection axis.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing a currently preferred embodiment of the invention, wherein.

DETAILED DESCRIPTION OF EMBODIMENTS OF THE INVENTION

In the following description, the present invention is mainly described with reference to a gyroscope sensor comprising four gyroscope units. It should, however, be noted that this by no means limits the scope of the invention, which is equally applicable to a gyroscope unit having a different number of gyroscope units other than four, but at least two. The described sensor herein are merely an example embodiment.

Figure 1A:
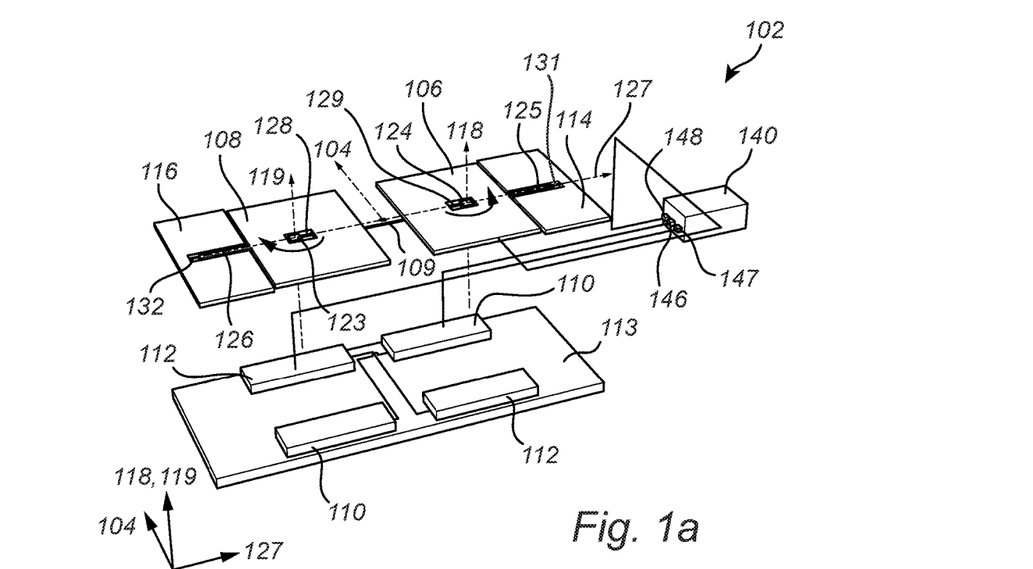
FIG. 1a-b illustrate an exploded view (FIG. 1a) of a gyroscope unit and a perspective view (FIG. 1b) of the same gyroscope unit.
Figure 1B:
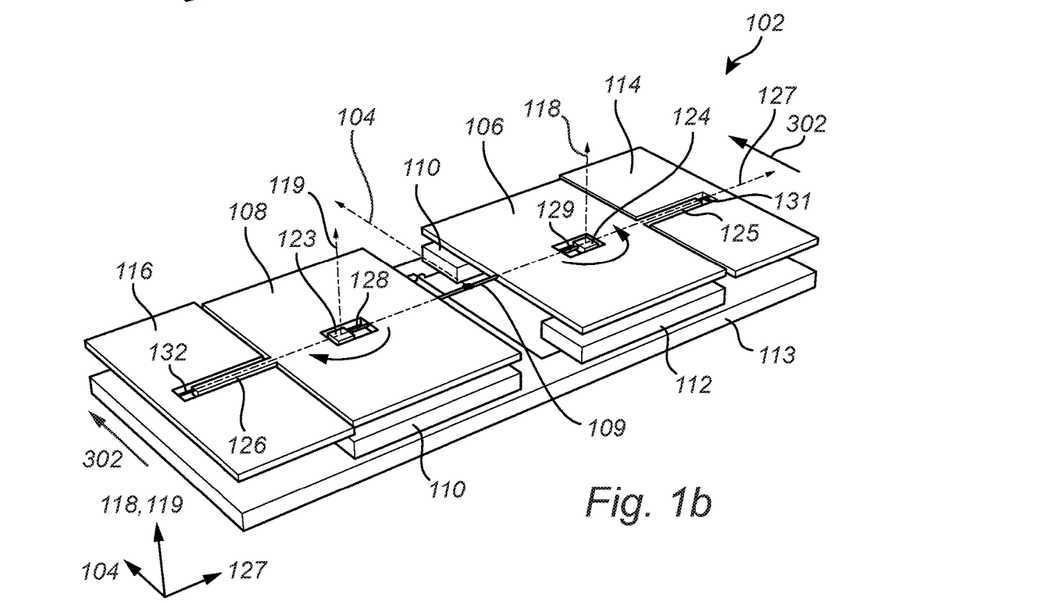

FIG. 1a illustrates an exploded view of a gyroscope unit 102 and FIG. 1b illustrates a perspective view of the gyroscope unit 102 shown in FIG. 1a, with the purpose of describing the basic principle of operation and the structural features of the gyroscope unit 102. There is further an electronic arrangement 140 electrically connected to the gyroscope unit 102. Thus, FIG. 1a-b illustrates a dual mass gyroscope unit 102 in accordance with the invention.

The gyroscope unit 102 comprises a first 106 and a second 108 inertial mass, a first 110 and a second electrode 112, and excitation means 114, 116. There is also indicated in FIG. 1a-b, a sensitivity axis 104, excitation axes 118, 119, and a detection axis 127 for the gyroscope unit 102. The coordinate axes illustrates the orientation of the different axes 104, 118, 119, 127. The first 106 and the second 108 inertial mass are physically attached to each other with the connecting member 109. The connecting member 109 may be in the form of a transverse beam or spring (the list is non-exhaustive) interconnecting the first 106 and the second 108 inertial mass. Each inertial mass 106, 108 is arranged spatially spaced apart from and facing a first electrode 110 as well as a second electrode 112. The electrodes 110, 112 are arranged on a supporting substrate 113, and the electrodes 110, 112 are also arranged separated from the inertial masses 106, 108. For example, in a resting position of the inertial masses 106, 108, the electrodes 110, 112 are arranged in a plane parallel to the plane of the inertial masses 106, 108.

The inertial masses 106, 108 are suspended at the anchor points 123, 124 respectively via for example springs 128, 129 such that the first and second inertial mass 106, 108 may oscillate in a rotational motion about a respective excitation axis 118, 119. The first and the second inertial mass 106, 108 are further connected to a respective excitation means 114, 116. For example, the first inertial mass 106 is physically connected to excitation means 114 via a coupling member 125 and the second inertial mass 108 is physically connected to excitation means 116 via a coupling member 126 (e.g. a connecting rod, beam or spring, this list is non-exhaustive). Furthermore, the coupling members 125, 126 may for example be a beam with a spring type connection 131, 132 to the respective excitation means 114, 116. Or, the coupling members 125, 126 may for example be a rod with a spring type connection 131, 132 to the respective excitation means 114, 116.

Figure 3:
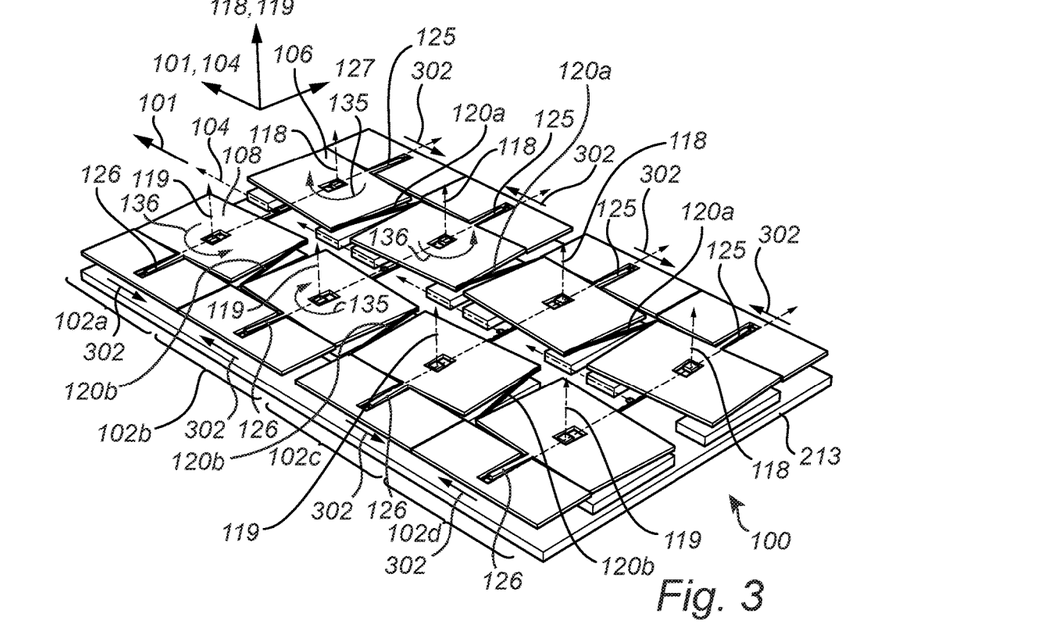
FIG. 3 shows an exemplary embodiment of the invention in a drive mode.

As the excitation means 114, 116 are actuated to move in a lateral direction, indicated by arrows 302, for example in a direction substantially parallel with the sensitivity axis 104, the excitation means 114, 116 together with the coupling members 125, 126 cause the respective inertial mass 106, 108 to rotate about the respective excitation axis 118, 119. This is illustrated in FIG. 3 for a sensor comprising four gyroscope units 102.

Figure 4:
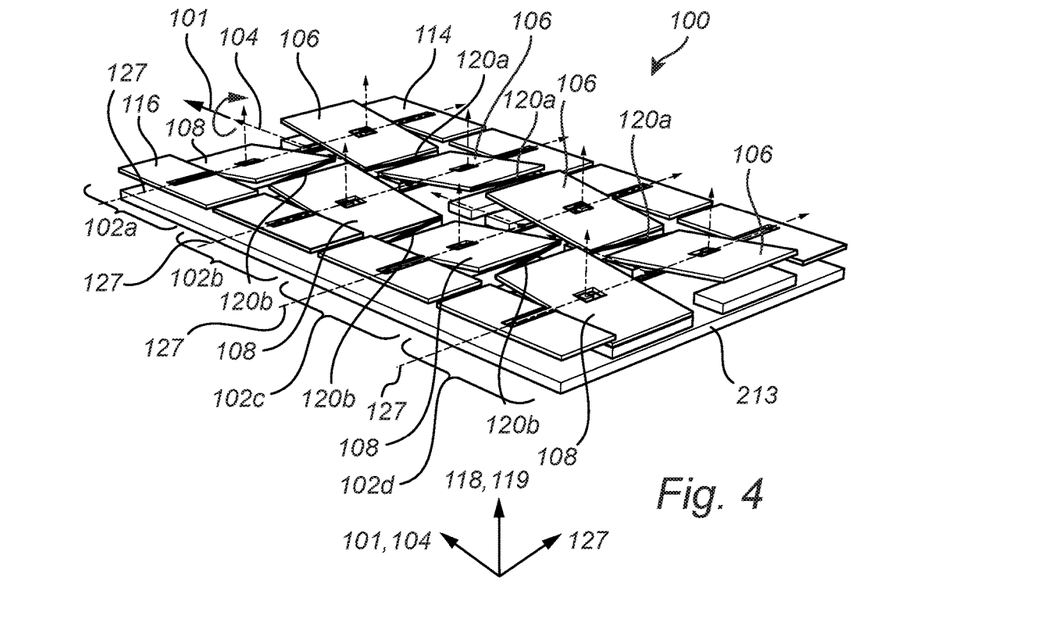
FIG. 4 shows an exemplary embodiment of the invention in a sense mode.

If the gyroscope unit 102 is subjected to a rotation about the sensitivity axis 104, the inertial masses if they are excited to oscillate about the excitation axis, will also oscillate in a rotational manner about the detection axis 127 due to the corolis force. The rotational oscillation about the detection axis is also called the sense mode and is illustrated in FIG. 4.

In the sense mode (illustrated in FIG. 4) the first 106 and the second inertial mass 108 oscillate about the detection axis 127. FIG. 4 illustrates one position of the oscillation. This oscillation causes the distance between the respective inertial mass 106, 108 and each electrode 110, 112 to change periodically with the oscillation. Thereby, also the capacitances between the inertial mass 106, 108 and the electrodes 110, 112 change periodically. The excitation of the inertial masses (see e.g. FIG. 3) is performed at an excitation frequency. Thus the first 106 and the second inertial mass 108 oscillate about the respective excitation 118, 119 axis with the excitation frequency. Thereby, the oscillation rotational motion of the inertial masses 106, 108 about the detection axis 127 as shown in FIG. 4 will be synchronous with the oscillation of the inertial masses 106, 108 about the excitation axis 118, 119. Thus, the capacitance change between the inertial mass 106, 108 and the electrodes 110, 112 will therefore also be synchronous with the excitation frequency.

Furthermore, FIG. 1 schematically shows an electronic arrangement 140 connected to the gyroscope unit 102 for detecting a capacitance change indicative of the rotation about the sensitivity axis 104. As previously described, spaced apart from the first 106 and second inertial mass 108, a set of electrodes 110, 112 is arranged for the gyroscope unit 102. The electronic arrangement 140 comprises input terminals 146-148. The first input terminal 146 is electrically connected to the first electrode 110 and the second input terminal 147 is electrically connected to the second electrode 112. The third input terminal 148 is electrically connected to the first 106 and the second inertial mass 108 (the first 106 and the second 108 inertial mass are electrically connected to each other via connecting member 109). According to one example embodiment, the masses 106, 108 and the connecting member 109 are made in one piece. The electronic arrangement 140 is configured to detect a capacitance between the total inertial mass 105 (the total inertial mass 105 constituting the first 106 and the second 108 inertial mass) and the first electrode 110, and to detect a capacitance between the total inertial mass and the second electrode 112, or a least to detect a voltage indicative of the respective capacitance or a change in capacitance. Furthermore, the output signal may be the differential capacitance difference between the capacitance between the first electrode 110 and the inertial mass 105 and the capacitance between the second electrode 112 and the inertial mass 105.

Figure 2:
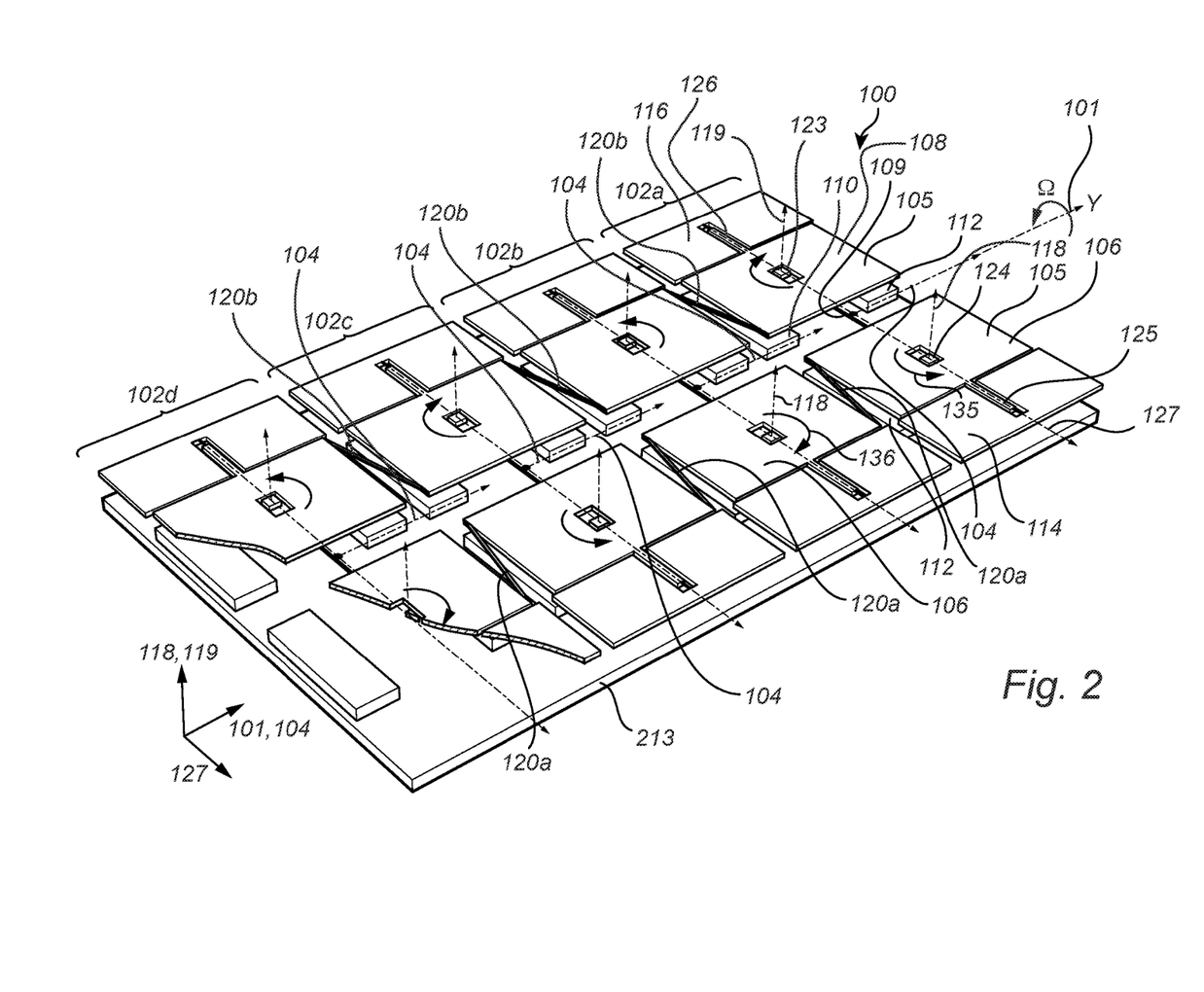
FIG. 2 schematically shows an exemplary embodiment of the invention.

FIG. 2 illustrates a perspective view of a sensor 100 according to an exemplary embodiment of the invention. The sensor 100 comprises four gyroscope units 102a-d, each arranged as described with reference to FIG. 1a-b, arranged in a column where adjacent gyroscope units 102a-d are physically connected to each other by a respective connecting element 120a, 120b. As will be further described in with reference to subsequent drawings, the connecting element 120a, 120b forces inertial masses 106, 108 of the interconnected gyroscope units 102a-b, 102b-c, 102c-d to oscillate synchronously in anti-phase. In other words, the first mass 106 of a gyroscope unit 102a is connected by a connecting element 120a to the first mass 106 of a second gyroscope unit 102b. If the first mass 106 of the first gyroscope unit 102a is rotated in a first direction 135 about its excitation axis 118, the rotation causes via the connection element 120a the first mass 106 of the second gyroscope unit 102b to rotate about its respective excitation axis 118 in an opposite direction 136 compared to the first direction 135. And vice versa, when the first mass 106 of 102a is rotated in the opposite direction 136 to the first direction 135, the first mass 106 of gyroscope unit 102b is caused to rotate in the first direction 135.

The sensor 100 is adapted to measure a rotational motion about a resulting sensitivity axis 101 coincident with sensitivity axes 104 of the gyroscope units 102a-d. Furthermore, the first electrodes 110 of the each gyroscope unit 102a-d are electrically connected to each other and the second electrodes 112 of each gyroscope unit 102a-d are electrically connected to each other. These electrical connections may be done either on the substrate 213 or external to the substrate 213.

The sensor as shown in the embodiment of FIG. 2 is illustrated as a substantially planar sensor. Thus, the first 106 and second inertial mass 108, the connection element 120a, 120b, and the coupling members 125, 126 may be formed in a single unit manufactured by e.g. epitaxial growth on a substrate 213 (e.g. a Si-substrate) and patterned and etched using lithography and etching methods of micro- and nanofabrication techniques capable of manufacturing a structure (inertial masses and connection element) having even and well-defined thickness.

FIG. 3 illustrates the motion of the inertial masses 106, 108 of the sensor 100 in the drive mode and FIG. 4 illustrates the sense mode of the sensor 100.

In the drive mode, shown in FIG. 3, the each of the excitation means 114, 116 of the gyroscope units 102a-d are exciting the respective inertial mass 106, 108 about the respective excitation axis 118, 119 by a motion of the excitation means 114, 116 in a lateral direction indicated by the arrows 302. Subsequently each of the excitation means 114, 116 moves in a direction opposite the arrows 302. In other words, each of the excitation means 114, 116 alternatingly move along a direction as indicated by the arrows 302, i.e. they move back and forth along an axis substantially parallel to the sensitivity axis. Each inertial mass 106, 108 is physically connected to a respective excitation means 114, 116 with a coupling member 125, 126 such that the motion of the excitation means causes the respective inertial mass 106, 108 to oscillate in a rotational motion about the excitation axis 118, 119. During operation of the sensor 100, in the drive mode of the sensor, the excitation means 114, 116 thereby excites the respective inertial mass 106, 108 of the respective gyroscope unit 102a-d to oscillate in a rotational motion about the excitation axis 118, 119.

The excitation means 114, 116 are arranged to excite the inertial masses 106, 108 of each individual gyroscope unit 102a-d so that the inertial masses rotate synchronously in anti-phase with respect to each other about the respective excitation axis 118, 119 as illustrated in FIG. 3. The connecting element 120a-c which physically connects the first mass 106 of a first gyroscope unit 102a with the first mass 106 of an adjacent gyroscope unit 102b, and similarly a second connecting element 120b connects the second masses 108 of adjacent gyroscope units 102a-b, causes the first 106 and second mass 108 of the adjacent gyroscope units 102 to synchronously oscillate in anti-phase. For example, the connecting element may have an Z-shape as shown in e.g. FIG. 5b. With this shape, although other shapes are possible, the connecting element 120a-c may effectively use the motion of e.g. the first inertial mass 106 of a first gyroscope unit 102a to push or pull on the first inertial mass 106 of a second gyroscope 120b unit. Furthermore, in a similar way the second inertial mass 108 of a second gyroscope unit 102b may pull or push on the second inertial mass 108 of a first gyroscope unit 102a.

When the sensor is in the drive mode, thus when the inertial masses are being excited as described with reference to FIG. 3, and if the sensor 100 is then subjected to a rotation about the resulting sensitivity axis 101 (note that all the sensitivity axes 104 of the individual gyroscope units 102a-d coincide, thus forming a total sensitivity axis 101), then the coriolis force cause a rotational motion of the inertial masses 106, 108 about the detection axis 127 of the respective inertial mass 106, 108 in a way as shown in FIG. 4. Furthermore, as described with reference to FIG. 3, the excitation of the inertial masses 106, 108 about the respective excitation axis 118,119 is such that the inertial masses 106, 108 oscillate synchronously out of phase. In other words, when the inertial mass 106 rotate in a first (e.g. clockwise) direction 135, the second inertial mass 108 rotate in an opposite direction 136, here in the counter-clockwise direction. This out of phase oscillation leads to the similar anti-phase motion in the sense mode as described with reference to FIG. 4. Thus, as the inertial mass 106 rotate in a clockwise direction, the inertial mass 108 rotate in a counter-clockwise direction about the detection axis 127. In the sense mode, the connection element 120a may also forces the rotational motion about the detection axis 127 of the inertial masses 106, 108 interconnected with the connection element 120a to be more synchronous.

Furthermore, the connecting element 120a is adapted to physically connect the first masses 106 of adjacent gyroscope units 102a-b, 102b-c, 102c-d, and in the same way a second connecting element 120b physically connects the second masses 108 of adjacent gyroscope units 102a-b, 102b-c, 102c-d. Since the first electrode 110 of each gyroscope unit 102a-d is electrically connected and also the second electrode of each gyroscope unit 102a-d is electrically connected, the electronic arrangement 140 (as shown in FIG. 1) measures a resulting signal from all gyroscope units 102a-d operating synchronously. The synchronous operation is possible due to the physical connection obtained between gyroscope units 102a-d with the connecting elements 120a-c.

Figures 5A, 5B:
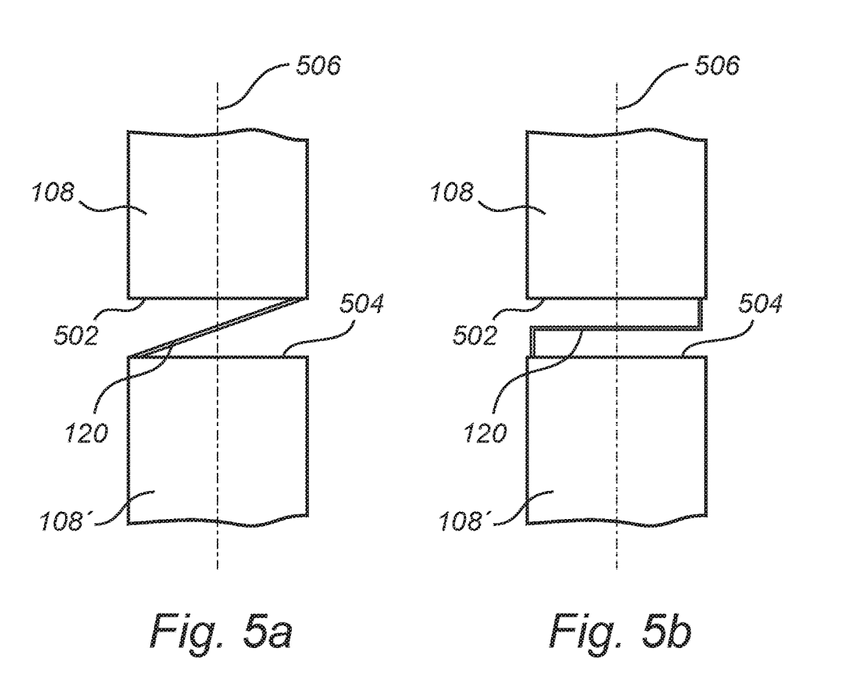
FIG. 5a-f illustrate example connection elements of the invention.
Figures 5C, 5D:
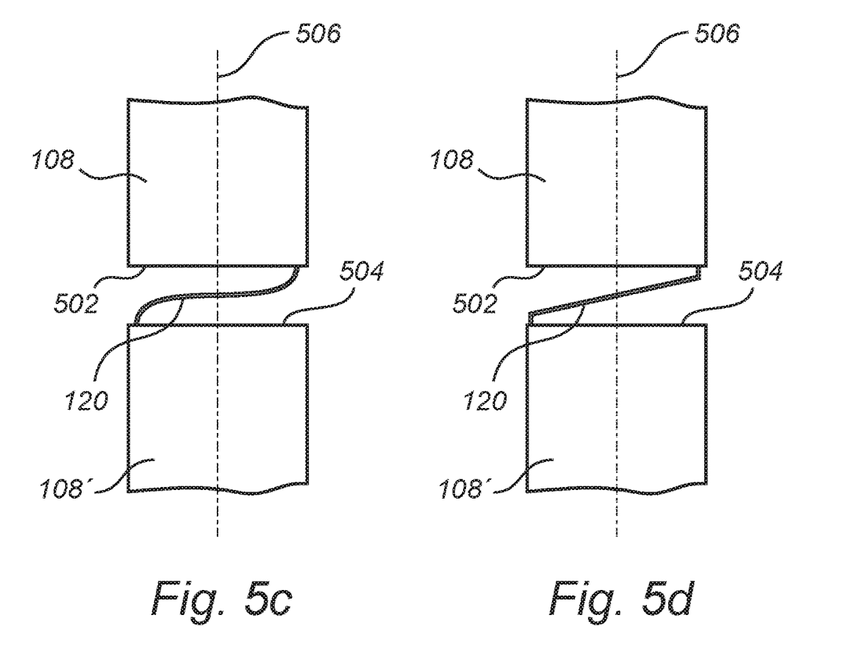
Figure 5E:
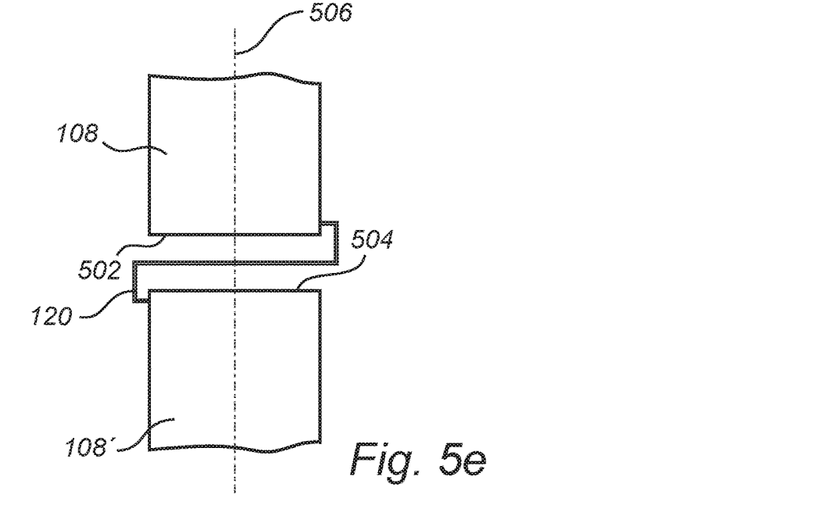
Figure 5F:
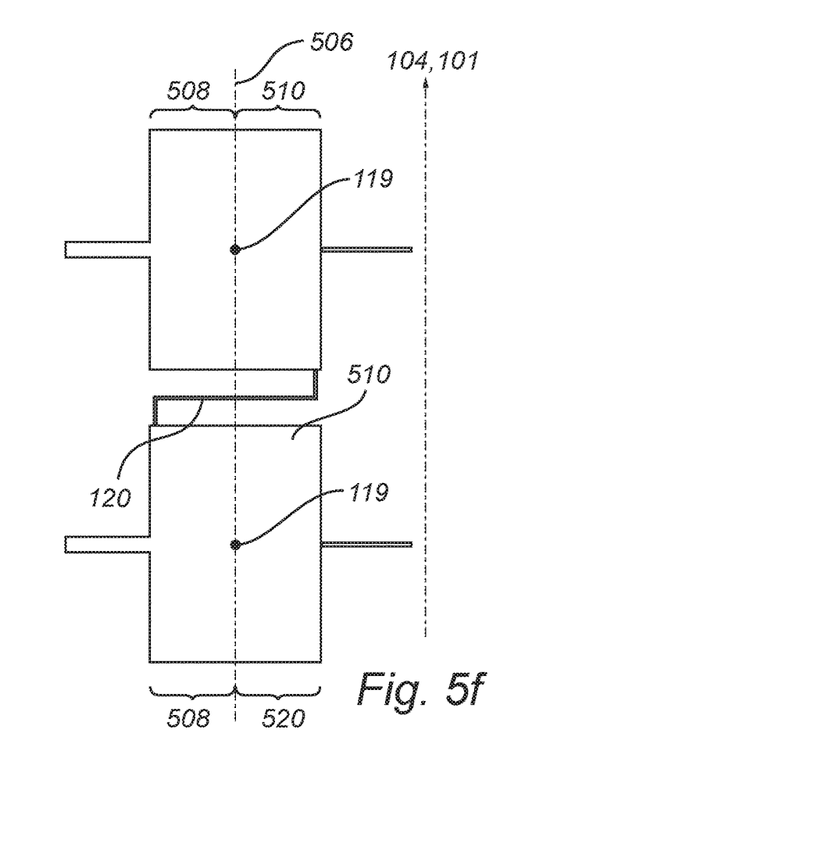

FIG. 5a-e illustrate different shapes for the connecting element 120. In each of the drawings, there is shown an inertial mass 108, 108' which may be for example the second inertial mass 108, 108' of adjacent gyroscope units 102a-d. For example, a first gyroscope unit may comprises the second inertial mass 108 and a second gyroscope unit may comprise the second inertial mass 108'. FIG. 5a shows connecting element 120 having a substantially straight shape, FIG. 5b shows a variant of an Z-shape, FIG. 5c shows a variant of an S-shape, FIG. 5d shows a variant of a Z-shape, and FIG. 5e shows a further possible configuration of the connection element 120. In FIG. 5a-d, the connecting element 120 is attached to sides 502, 504 which face each other, of the respective inertial mass 108, 108'. Furthermore, in FIGS. 5a-e a first end of the connecting element 120 is attached to a respective half portion of the first of the respective inertial mass 108, 108', which is different from the half portion of the second inertial mass to which the other end of the connecting element is attached. As shown in FIG. 5f, the half portion being defined on opposite sides 508, 510 of an axis 506 parallel to the sensitivity axis 104, 101 and intersecting the excitation axis 119 (or excitation axis 118 on the other inertial mass 106, if the other mass is considered) of the inertial mass 108.

The connecting element 120 may be in the form of a self-supporting micro beam. The connecting element 120 may further be in the form of a spring. Furthermore, the connecting element may be in the form of a plate spring or a leaf spring. The connecting element 120 may be configured to be self-supporting and thereby being able to move freely apart from being connected to the inertial masses. The connecting element may further be flexible. Furthermore, the connecting element 120 may be sufficiently stiff in order to more efficiently force the inertial masses to oscillate synchronously in anti-phase. Additionally or alternatively, the height of the connecting element 120 is larger than the width of the connecting element 120. It is understood that the height is measured in a direction parallel with the excitation axis 118, and the width in a direction orthogonal to the excitation axis 118. Furthermore, for facilitating manufacturing of the sensor, the height of the connecting element 120 may be the same as the thickness of the sensor. However, the height of the connecting element 120 may be of other heights such as about half the thickness of the sensor, or about 75% of the thickness of the sensor, or about 120% of the thickness of the sensor.

The sensor may be made from silicon or a material comprising silicon, such as e.g. poly-silicon (polycrystalline silicon) or single crystalline silicon, but also other suitable material(s) known in the art.

Each of the gyroscope units 102a-d may be based on the gyroscope disclosed by U.S. Pat. No. 6,467,349, also by the applicant of the present patent application.

Additionally, variations to the disclosed embodiments can be understood and effected by the skilled person in practicing the claimed invention, from a study of the drawings, the disclosure, and the appended claims. For example, the number of gyroscope units may be less or more than four as depicted herein, for example, two, three, five, six, or more. Furthermore, as illustrated in FIG. 1a, the first electrodes 110 are electrically connected to each other and the second electrodes 112 are electrically connected to each other. Although depicted herein as being electrically connected to each other on the substrate, other ways of electrically connecting the first electrodes 110 to each other and the second electrodes 112 to each other are of course possible.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A sensor for detecting a rotational motion about a resulting sensitivity axis, said sensor comprising:
   at least two dual mass gyroscope units, each of said at least two dual mass gyroscope units being adapted to detect a rotational motion about a sensitivity axis of the respective gyroscope unit of said at least two dual mass gyroscope units, said sensitivity axes being parallel to each other and to said resulting sensitivity axis, each of said at least two dual mass gyroscope units comprising:
      a total inertial mass comprising a first inertial mass and a second inertial mass physically attached to each other, each of said first inertial mass and said second inertial mass being arranged spaced apart from and facing a respective first electrode and a respective second electrode, wherein a rotation of said first inertial mass about a detection axis of said respective gyroscope unit, said detection axis being perpendicular to said sensitivity axis and said rotation being caused by a coriolis force when said respective gyroscope unit is subjected to a rotation about said sensitivity axis, results in a positive change of a capacitance between said total inertial mass and one of said first electrode and said second electrode and a negative change of a capacitance between said total inertial mass and the other one of said first electrode and said second electrode;

first excitation means for causing the first inertial mass to oscillate in a rotational motion about a first excitation axis substantially perpendicular to said sensitivity axis of said respective gyroscope unit; and second excitation means for exciting the second inertial mass to oscillate in a rotational motion about a second excitation axis substantially perpendicular to said sensitivity axis of said respective gyroscope unit and parallel with said first excitation axis, said oscillation of said second inertial mass being in anti-phase with said oscillation of said first inertial mass;

wherein the first inertial mass of a first gyroscope unit of said at least two dual mass gyroscope units is connected by a connecting element to the first inertial mass of a second gyroscope unit of said at least two dual mass gyroscope units such that a rotation of said first inertial mass of said first gyroscope unit in a first direction about said excitation axis causes said first inertial mass of said second gyroscope unit to rotate in an opposite direction compared to said first direction; and wherein each of said first and second inertial masses of each respective gyroscope unit of said at least two dual mass gyroscope units comprises a first half portion and a second half portion, said first half portion and said second half portion being defined by opposite sides of an axis parallel to said sensitivity axis and intersecting the excitation axis of the respective mass, and wherein said connecting element is connected to said first half portion of said first inertial mass of said first gyroscope unit and to said second half portion of said first inertial mass of said second gyroscope unit.

2. The sensor according to claim 1, wherein said connecting element is connected to a first side of said first inertial mass of said first gyroscope unit, and to a second side of the first inertial mass of the second gyroscope unit, wherein said first side and said second side face each other.

3. The sensor according to claim 1, wherein said connecting element is self-supporting.

4. The sensor according to claim 1, wherein said connecting element is S-shaped or Z-shaped.

5. The sensor according to claim 1, wherein said oscillation of said first inertial mass of said first gyroscope unit and said first inertial mass of said second gyroscope unit is synchronous and in anti-phase with respect to each other about said respective excitation axis.

6. The sensor according to claim 1, wherein said gyroscope units are provided with drive frames comprising said first excitation means and said second excitation means, said drive frames are arranged external to said first and second inertial masses, each of said drive frames being connected to a respective mass with a coupling member.

7. The sensor according to claim 6, wherein each of said first excitation means and said second excitation means is configured to alternatingly move each of said drive frames along a direction substantially parallel to said sensitivity axis in order to cause each of said first inertial mass and said second inertial mass to oscillate in a rotational motion about said first excitation axis and said second excitation axis respectively.

8. The sensor according to claim 1, wherein said at least two gyroscope dual mass units are further connected via a second connecting element, wherein the second inertial mass of the first gyroscope unit is connected by said second connecting element to the second inertial mass of the second gyroscope unit such that a rotation of said second inertial mass of said first gyroscope unit in a first direction about the corresponding excitation axis causes said second inertial mass of said second gyroscope unit to rotate about the excitation axis of said second gyroscope unit in an opposite direction compared to said first direction.

9. The sensor according to claim 1, wherein said sensor is a planar sensor.

10. The sensor according to claim 1, wherein said sensor is formed in a single unit.

11. The sensor according to claim 1, comprising an even number of gyroscope units.

12. The sensor according to claim 1, wherein said connecting element is a resilient connection.

13. The sensor according to claim 1, wherein said first and second inertial masses are physically connected via an elongated connector, wherein said first and second inertial masses are symmetrically arranged with respect to the elongated connector.

14. The sensor according to claim 1, wherein a shape of said first inertial mass is substantially the same as a shape of said second inertial mass.

15. The sensor according to claim 1, wherein said connecting element forces a rotational motion of said first inertial mass of the first gyroscope unit about said detection axis to be synchronous with a rotational motion of said first inertial mass of the second gyroscope unit about the respective detection axis.

* * * * *

UNITED STATES PATENT AND TRADEMARK OFFICE
CERTIFICATE OF CORRECTION

PATENT NO. : 9,976,858 B2
APPLICATION NO. : 15/532151
DATED : May 22, 2018
INVENTOR(S) : Gert Andersson et al.

Page 1 of 1

It is certified that error appears in the above-identified patent and that said Letters Patent is hereby corrected as shown below:

On the Title Page

Item (71) should be corrected to:
(71) Applicant: RISE ACREO AE, Kista (SE)

Signed and Sealed this
Third Day of September, 2019

Andrei Iancu
*Director of the United States Patent and Trademark Office*